United States Patent Office 2,925,356
Patented Feb. 16, 1960

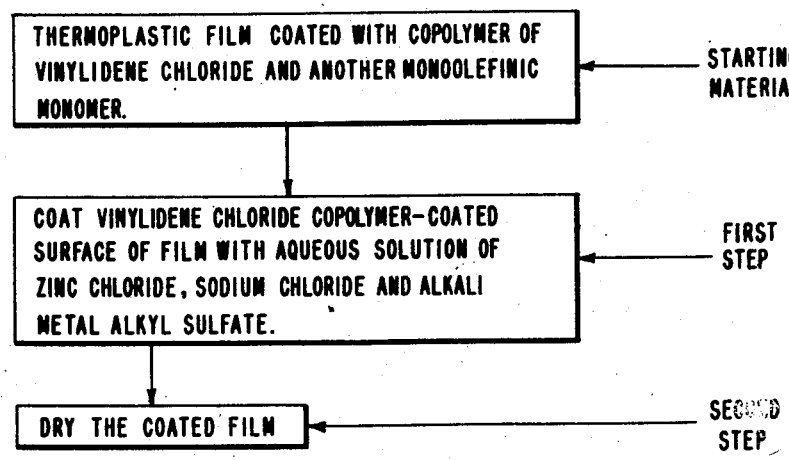

2,925,356

THERMOPLASTIC FILMS COATED WITH VINYL-IDENE CHLORIDE COPOLYMER AND AN ANTI-STATIC AGENT

David Ivan Sapper, Cheektowaga, N.Y., assignor to E. I. du Pont de Nemours and Company, Wilmington, Del., a corporation of Delaware Application April 24, 1956, Serial No. 580,169

6 Claims. (Cl. 117—72)

This invention relates to the treatment of synthetic thermoplastic film and, more particularly, to the surface treatment of organic polymeric thermoplastic film having a coating of a copolymer of vinylidene chloride and at least one other mono-olefinic monomer copolymerizable therewith.

Organic polymeric thermoplastic films, such as films of polyethylene terephthalate, polyethylene, polystyrene, rubber hydrochloride and polyvinyl chloride, top-coated on one or both sides with a coating comprised essentially of a copolymer of vinylidene chloride and at least one other monoolefinic monomer copolymerizable therewith, exhibit excellent transparency, strength, durability, heat-sealability and moistureproofness, as well as a low degree of permeability to gases which particularly suit them for use as packaging materials. A major disadvantage of such films, however, is their high electrostatic propensity, i.e., susceptibility to the accumulation of static charges which precludes their use on many types of automatic packaging machinery. For example, the static charge tends to cause the film to cling to the metal feed plates of the packaging machine with resultant jamming of the machine. Anti-static compositions heretofore developed for reducing the static propensities of polymeric structures generally adversely affect, i.e., degrade, one or more properties, and especially the heat-sealability, of thermoplastic films carrying a top-coating of vinylidene copolymer.

A principal object of this invention therefore is to substantially reduce the electrostatic propensities of organic polymeric thermoplastic films top-coated with a copolymer of vinylidene chloride and at least one other mono-olefinic monomer copolymerizable therewith, without sacrificing or degrading other desirable properties, e.g., the heat-sealability, of the films. A further object is to provide for an overall improvement in the surface characteristics of transparent organic polymeric thermoplastic films top-coated with a copolymer of vinylidene chloride and at least one other monoolefinic monomer copolymerizable therewith. The foregoing and other objects will more clearly appear hereinafter.

These objects are realized by the present invention which, briefly stated, comprises coating the surface of organic polymeric thermoplastic film, e.g., polyethylene terephthalate film, said film having a top-coating comprising essentially a copolymer of vinylidene chloride, in major proportion, and at least one other mono-olefinic monomer copolymerizable therewith, with an aqueous solution comprising from 0.020 to 1.0% by weight of zinc chloride, based on the total weight of the water in the solution, from 0.027 to 1.4% of sodium chloride, and from 0.025 to 1.0% of an alkali metal alkyl sulfate containing at least 8 carbon atoms in the alkyl group, said aqueous solution being applied in sufficient amount to uniformly deposit on the coated film surface from 0.75 to 45 milligrams of solids per square meter of surface and thereafter drying the coated film.

The drawing, which comprises one figure, is a flow diagram illustrating the process of coating in accordance with the present invention.

The invention will be described hereinafter with specific reference to polyethylene terephthalate base film having a top-coating of a copolymer of vinylidene chloride and at least one other mono-olefinic monomer copolymerizable therewith. It is to be understood, however, that the invention is applicable to any organic polymeric thermoplastic base film such as polyethylene, rubber hydrochloride, polyvinyl chloride, polystyrene, etc., carrying the prescribed copolymer top-coating. The base film may be unoriented, or oriented in one or both directions by any suitable expedient such as rolling and/or stretching, and heat-set, if desired.

The vinylidene chloride copolymers employed in the top-coat contain at least 50% vinylidene chloride, and for optimum coating properties, the copolymer should contain from 80% to 97% of vinylidene chloride. Representative mono-olefinic monomers copolymerizable with vinylidene chloride include: methyl, ethyl, isobutyl, butyl, octyl and 2-ethyl hexyl acrylates and methacrylates; phenyl methacrylate, cyclohexyl methacrylate, p-cyclohexylphenyl methacrylate, methoxyethyl methacrylate, chloroethyl methacrylate, 2-nitro-2-methylpropyl methacrylate and the corresponding esters of acrylic acid; methyl alpha-chloroacrylate, octyl alpha-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, isopropenyl acetate, acrylamide, methacrylamide and alkyl substitution products thereof, phenyl vinyl ketone, diethyl fumarate, diethyl maleate, methylene diethyl malonate, dichlorovinylidene fluoride, dimethyl itaconate, diethyl itaconate, dibutyl itaconate, vinyl pyridine, maleic anhydride, allyl glycidyl ether and other unsaturated aliphatic ethers described in U.S. Patent 2,160,943. These compounds may be generally defined as vinyl or vinylidene compounds having a single $CH_2=C<$ group. The most useful monomers fall within the general formula

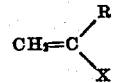

where R may be hydrogen, halogen, or saturated aliphatic radical, and X is a member of the group consisting of —Cl, —Br, —F, —CN, —$C_6H_5$, —COOH,

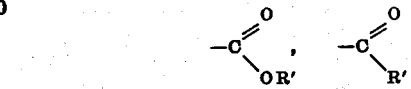

—HC=O, —$OC_6H_5$, —$CONH_2$, —CONH—R′, and —$CONR'_2$ in which R′ is alkyl.

The anti-static composition is applied to the vinylidene chloride copolymer coated film in the form of an aqueous solution. The application of the solution may be accomplished by any convenient expedient such as dipping, spraying, brushing, roll-coating, etc., preferably at room temperature. A preferred embodiment is to pass the film through a dip tank containing the anti-static formulation. With this method, it is possible to deposit a higher concentration of solids utilizing a lesser concentration of solids in the solution. Spray-sizing, for example, requires approximately a ten-fold increase in concentration of solids in the aqueous solution to effect an equivalent solids deposition upon the surface of the coated film. The aqueous solution should be applied in such amount that there will be deposited from 0.75–45 milligrams, and preferably 2.5–25 milligrams, of solids per square meter of the vinylidene chloride copolymer coated structure.

The concentration of zinc chloride, which is believed to be the active anti-static ingredient, may range from 0.14–9.4 milligrams per square meter. The concentration of zinc chloride in the aqueous formulation required to deposit the above-mentioned concentration of zinc chloride upon the surface of the coated film will range from 0.020–1.0% by weight, based on the total weight of water in the composition. This figure will depend upon the method used to apply the aqueous solution upon the film. If the film is dip-sized, the preferred composition of zinc chloride will range between 0.05–0.25%. In the case of spray-sizing, the concentration of zinc chloride will lie between 0.25–1%.

The sodium chloride appears to function chiefly as an anti-blocking agent. Crystals of the salt precipitate upon the film surface and these crystals function, in part at least, to separate adjacent film layers and, hence, prevent film-to-film sticking. Sodium chloride crystals should be used at a concentration within the range of 0.027–1.4% based upon the weight of water.

As examples of the alkali metal alkyl metal sulfates in which the alkyl group contains eight or more carbon atoms, there may be mentioned: sodium oleyl sulfate, sodium lauryl sulfate, sodium stearyl sulfate, sodium myristyl sulfate, sodium cetyl sulfate, etc., or mixtures thereof. The preferred concentration of alkali metal alkyl sulfate is from 0.025–1%, based on the weight of water.

The following examples of specific preferred embodiments further illustrate the principles and practice of this invention. Parts and percentages are by weight unless otherwise indicated.

EXAMPLE 1

A 4½" wide, 0.5 mil thick polyethylene terephthalate film, top-coated with a 94/6/2 vinylidene chloride/ethyl acrylate/itaconic acid copolymer containing 1% "Geon" 121[1] particles as a slip-promoting agent, was passed through the anti-static solution, specified in Table I, at a rate of 7.5–15 ft./min. The excess solution was passed off by passing the treated film through doctor rolls set with an opening of 1.5–2 mils. The film was dried at 90–130° C. Tests were conducted on the film for electrostatic propensity and heat-sealability as described hereinbefore. These tests were conducted at 75° F. and 35% relative humidity.

The electrostatic propensity (susceptibility) characteristics of each film hereinafter set forth for purposes of comparison was measured in accordance with the following procedure:

A strip of film, trimmed to 1" x 4" in size, is supported on and in electrical contact with a flat, slightly roughened stainless steel plate which is connected to a meter for measuring electrical potential, but which is otherwise insulated from its surroundings. The plate is roughened by rubbing it lightly with a #100/120 Carborundum cloth, making various light scratches at right angles to the direction of movement of the film. A weighted, felt-covered block which has a 1" x 2" face, presses the film into contact with the stainless steel plate. An electrostatic charge is generated by pulling the film for a distance of 3" between the weighted block and the stainless steel plate, and the charge so generated on the film discharges onto the stainless steel plate with which it is in contact and is measured by the meter. The values registered on the meter (herein called "electrostatic susceptibility") are purely relative and are useful only for purposes of comparison. They indicate the ability of the film to accumulate an electrostatic charge under the influence of friction normally encountered in manipulating or working with the film.

Table I below shows the ratio of ingredients in the anti-

[1] Copolymerized polyvinyl chloride, Goodrich Chemical Co.

static formulation, and the electrostatic propensity of the film in volts.

Table I

| Run No. | Bath Composition (Percent) | | Sodium Lauryl Sulfate | Average Electrostatic Propensity (Volts) |
| --- | --- | --- | --- | --- |
| | Zinc Chloride | Sodium Chloride | | |
| Control | | | | 335 |
| 1 | 0.05 | 0.07 | 0.1 | 10 |
| 2 | 0.05 | 0.14 | | 45 |
| 3 | 0.025 | | | 535 |

From Table I, it can be seen that zinc chloride alone (0.025%) did not improve the anti-static properties of the film. Zinc chloride with 0.14% sodium chloride was found to provide anti-static protection, but the heat-sealability was found to be somewhat degraded.

EXAMPLE 2

This example illustrates spray-sizing compositions and properties of the sized films. A spray bath was prepared as follows: 1 part of sodium lauryl sulfate was dissolved in 8 parts of the water. 0.5 part of zinc chloride, 0.7 part of sodium chloride and about 10 cc. of concentrated hydrochloric acid (to inhibit precipitation of $ZnCl_2$) were dissolved in 4 parts of the water. The sodium lauryl sulfate solution was stirred into 85 parts of water and the acidified salt solution added. The presence of acid was found necessary to prevent a precipitate (presumably zinc hydroxide) from forming in the bath. The composition, so prepared, was then sprayed on the vinylidene chloride copolymer top-coated film of Example 1. Tests run on the film spray-coated with the above formulation showed the film to have an electrostatic susceptibility of 0 and heat-sealability of 640 at 160° C. with a dwell time of 2 seconds, and 520 at 240° C. with a dwell time of 0.15 second.

Table II, below, illustrates the effect of varying percentages of ingredients in the anti-static formulation for spray-sized films on the electrostatic propensity of the film.

Table II

| Run No. | Bath Composition (Percent) | | Sodium Lauryl Sulfate | Average Electrostatic Propensity (Volts) |
| --- | --- | --- | --- | --- |
| | Zinc Chloride | Sodium Chloride | | |
| Control | | | | 370 |
| 1 | 0.5 | 0.7 | 1.0 | 0 |
| 2 | 0.7 | 0.7 | 1.0 | 30 |
| 3 | 0.8 | 0.7 | 0.2 | 0 |
| 4 | 0.8 | 0.7 | 0.4 | 0 |
| 5 | 0.8 | 0.7 | 1.0 | 0 |

Table II shows that spray-sizing requires a ten-fold increase in concentration over dip-sizing to obtain an equivalent anti-static effect.

EXAMPLE 3

In this example, the coated polyethylene terephthalate film identical with those utilized in the previous examples was passed through a dip tank containing varying aqueous-sized formulations which were acidified with concentrated hydrochloric acid to prevent precipitation of basic zinc compounds. Following the dip tank, the film was passed through rubber squeeze rolls adjusted to 80 lbs./sq. in. and then into a drier which was set to give drying temperatures of from 175° to 190° F.

Table III, below, shows the aqueous bath concentrations and the average electrical propensity for the treated film.

Table III

| Run No. | Bath Composition (Percent) | | Sodium Lauryl Sulfate | Average Electrostatic Propensity (Volts) |
|---|---|---|---|---|
| | Zinc Chloride | Sodium Chloride | | |
| Control | | | | 390 |
| 1 | 0.05 | 0.07 | 0.1 | 75 |
| 2 | 0.1 | 0.14 | 0.2 | 75 |
| 3 | 0.1 | 0.14 | 0.2 | 45 |
| 4 | 0.25 | 0.35 | 0.5 | 15 |
| 5 | 0.25 | 0.35 | 0.5 | 20 |
| 6 | 0.1 | 0.14 | 0.2 | 20 |
| 7 | 0.1 | 0.14 | 0.2 | 60 |
| 8 | 0.1 | 0.14 | 0.2 | 25 |
| 9 | 0.1 | 0.14 | 0.2 | 10 |
| 10 | 0.1 | 0.14 | 0.2 | 25 |

EXAMPLE 4

In a manner identical with that described in Example 3, double-coated films with vinylidene chloride copolymers were passed through a dip tank containing varying aqueous anti-static formulations. Table IV, below, lists the anti-static formulation, the average electrostatic propensity of the film, the concentration of zinc on the surface of the film, and the total concentration of anti-static agents (including zinc) on the film surfaces. The total concentration of anti-static agents on the film surface was determined by volumetric analysis. The concentration of zinc on the film surface was determined by subtracting the total concentration of zinc in the coated untreated film from the total concentration of zinc in and on the coated film. This was necessary since there may be a measurable amount of zinc in the untreated film.

Table IV

| Run No. | Bath Composition (Percent) | | | Concentration of Zinc Chloride on Surface of Film (milligrams per sq. meter) | Concentration of Sizing Agents on Film Surfaces (milligrams per sq. meter) | Average Electrostatic Propensity (Volts) |
|---|---|---|---|---|---|---|
| | Zinc Chloride | Sodium Chloride | Sodium Lauryl Sulfate | | | |
| 1 | 0.05 | 0.07 | 0.1 | 1.25 | 5.5 | 75 |
| 2 | 0.1 | 0.14 | 0.2 | 2.50 | 11.0 | 75 |
| 3 | 0.25 | 0.35 | 0.5 | 5.00 | 22.0 | 15 |
| 4 | 0.25 | 0.35 | 0.5 | 6.46 | 29.4 | 20 |
| 5 | 0.1 | 0.14 | 0.2 | 1.25 | 5.5 | 10 |
| 6 | 0.1 | 0.14 | 0.2 | 1.88 | 8.3 | 25 |

From the foregoing description and examples, it can now be seen that the anti-static formulations, characteristic of the process of the present invention, materially eliminate the problem of static charges on vinylidene chloride copolymer coated thermoplastic polymeric films. As can be seen from the tables listed hereinbefore, untreated vinylidene chloride copolymer coated polyethylene terephthalate films had an electrostatic propensity in excess of 350 volts. The double-coated films treated with the aqueous sizing solution characteristic of the present invention had electrostatic propensity values in all cases below an acceptable maximum value of 100 volts. This now makes double-coated vinylidene chloride copolymer coated films, with their many inherent advantages, available for use in all types of packaging machines. The vital properties of the double-coated films such as heat-sealability, are in no way impaired or diminished. The active components of the formulations have the added advantage of being readily available and are easily and inexpensively applied to the coated film.

I claim:

1. A method for reducing the static propensity of a coated synthetic thermoplastic film having a continuous top-coating comprising a copolymer of vinylidene chloride, in major proportion, and at least one other mono-olefinic monomer copolymerizable therewith, which comprises coating the coated surface of the coated film with an aqueous solution containing from 0.020–1.0% by weight of zinc chloride, based on the total weight of water in the solution, from 0.027 to 1.4% of sodium chloride and from 0.025 to 1.0% of an alkali metal alkyl sulfate containing at least 8 carbon atoms in the alkyl group, and thereafter drying said coated film.

2. A method, according to claim 1, wherein the copolymer contains from 80% to 97% by weight of vinylidene chloride.

3. A method, according to claim 1, wherein the alkali metal alkyl sulfate is a sodium alkyl sulfate.

4. A method, according to claim 1, wherein the alkali metal alkyl sulfate is sodium lauryl sulfate.

5. A method for reducing the static propensity of coated polyethylene terephthalate film having a continuous top-coating comprising a copolymer of vinylidene chloride, in major proportion, and at least one other mono-olefinic monomer copolymerizable therewith, which comprises coating the coated surface of the coated film with an aqueous solution containing from 0.020 to 1.0% by weight of zinc chloride, based on the total weight of water in the solution, from 0.027 to 1.4% of sodium chloride and from 0.025 to 1.0% of an alkali metal sulfate containing at least 8 carbon atoms in the alkyl group, and thereafter drying said coated film.

6. A method, according to claim 5, wherein the copolymer contains from 80% to 97% by weight of vinylidene chloride.

References Cited in the file of this patent

UNITED STATES PATENTS

| | | |
|---|---|---|
| 2,694,688 | Hughes | Nov. 16, 1954 |
| 2,717,842 | Vitalis | Sept. 13, 1955 |
| 2,748,027 | Meier | May 29, 1956 |
| 2,762,720 | Michel | Sept. 11, 1956 |
| 2,779,684 | Alles | Jan. 29, 1957 |
| 2,790,735 | McLaughlin | Apr. 30, 1957 |